Sept. 13, 1938.  C. FISCHER  2,130,127
GOGGLES
Filed Feb. 25, 1937
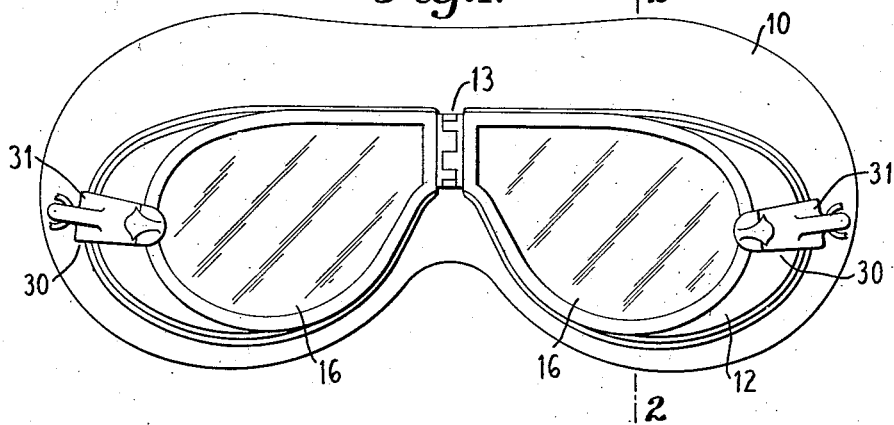
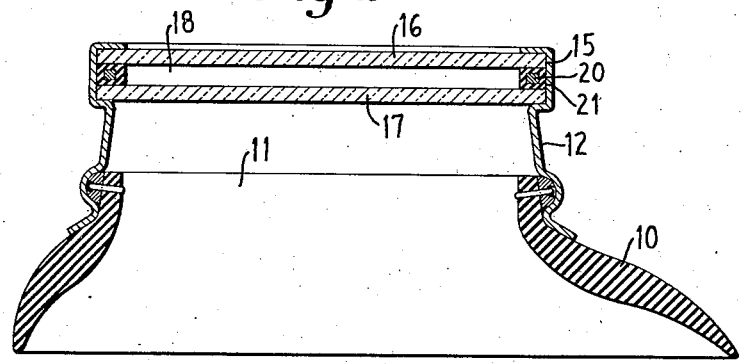
INVENTOR
Charles Fischer
BY
ATTORNEY Patented Sept. 13, 1938

2,130,127

UNITED STATES PATENT OFFICE 2,130,127

GOGGLES

Charles Fischer, New York, N. Y.

Application February 25, 1937, Serial No. 127,592

1 Claim. (Cl. 2—14)

The invention relates to improvements in goggles and has particularly to do with that type of goggles used by aviators, drivers of racing automobiles, motor boats or any other apparatus where a high speed is maintained.

The present invention has to do with the lens members and has for its object to provide goggles having lens members particularly adapted to be used for flying at high altitudes.

The application is a renewal in part of my abandoned application, Serial No. 622,200, filed July 13, 1932.

Other objects and advantages will become apparent as this specification proceeds. Referring to the drawing forming a part thereof:

Fig. 1 is a front elevation of the goggles embodying the improvements of the present invention;

Fig. 2 is a cross-sectional view taken on line 2—2 of Fig. 1;

Fig. 3 is a fragmentary detail sectional view of a modified form; and

Fig. 4 is a fragmentary detail sectional view of another modified form.

The goggles include a pad 10 composed of soft rubber, provided with eye openings 11, and adapted to efficiently and comfortably conform to the face of the wearer. Surrounding the eye openings and secured to the pad are light metal frames 12, suitably hinged together at 13.

Each of the frames 12 is provided at its outer portion, or at what might be termed the portion remote from the face pad 10, with an interior groove 15. This groove is adapted to receive the edges of a pair of lens members 16 and 17, and means are provided between the lens members for spacing them apart and thus providing an insulated and sealed air chamber 18 between them.

Various forms of spacing means may be employed. As illustrated in Fig. 2 a metal ring 20 can be used and this ring is covered with rubber 21, or any other suitable material having similar properties. Thus, when the ring, covered with a suitable resilient material, is placed between the two lens members 16 and 17 an absolutely sealed air chamber is provided. As shown in Fig. 3, the ring is formed entirely of rubber or some other suitable resilient material.

In the form illustrated in Figs. 1, 2 and 3 the frame at the outer, widest portion is open, or transversely split and is provided with a clamping means 30 for normally holding the edges of the frame along the opening in abutting relation. The slide 31 of the clamping means is operable to release the frame edge from abutting relation and permit the frame to open for the easy insertion or removal of the lens members.

In the form illustrated in Fig. 4 the frame 35 is provided with a seat or shelf 36 on which the lens members 16 and 17 and their spacing means rest. The frame 35 is made of one piece and a clamping frame 37 is utilized to hold the lens members in position.

It will be understood, that, in carrying the invention into practice, changes may be made in the improvements described, without departing from the principle thereof.

I claim:

In the goggles, the combination of a wide soft rubber pad provided with eye openings and adapted to efficiently and comfortably conform to the face of the wearer, light metal frames hinged together, said metal frames surrounding the eye openings and being secured to the pad, wide interior grooves formed in the frames at their outer portion remote from the pad, pairs of lens members fitted in the grooves, and spacing means seated in the grooves between said pairs of lens members to rigidly position the said pairs of lens members by engaging their adjacent surfaces throughout the perimeter of the groove, said spacing means comprising a single complete metallic ring covered with resilient material, thereby forming sealed air chambers between said pairs of lens members, said frames being transversely split so as to permit them to open for the insertion or removal of said lens members and their spacing means, and clamping means for normally holding the edges of the frames along the transverse openings in abutting relation.

CHARLES FISCHER.